May 30, 1939.　　J. L. DRAKE ET AL　　2,160,062
PRESSURE SYSTEM
Filed March 6, 1936　　3 Sheets-Sheet 1

Inventors
JOHN L. DRAKE.
LE ROY L. HANDY.
IVAL G. FOWLER.
Frank Fraser

May 30, 1939.  J. L. DRAKE ET AL  2,160,062

PRESSURE SYSTEM

Filed March 6, 1936  3 Sheets-Sheet 3

Inventors
JOHN L. DRAKE.
LE ROY L. HANDY.
IVAL G. FOWLER.

By Frank Fraser
Attorney

Patented May 30, 1939

2,160,062

UNITED STATES PATENT OFFICE 2,160,062

PRESSURE SYSTEM

John L. Drake, Le Roy L. Handy, and Ival G. Fowler, Toledo, Ohio, assignors to Libbey-Owens-Ford Glass Company, Toledo, Ohio, a corporation of Ohio Application March 6, 1936, Serial No. 67,464

14 Claims. (Cl. 23—290)

The present invention relates broadly to pressure systems and has particular reference to improved apparatus of this character which is especially adapted for use in the manufacture of laminated safety glass.

Generally speaking, laminated safety glass comprises two or more sheets of glass and one or more interposed, non-brittle membranes all bonded together to form a composite structure. In manufacturing this type of glass, it is customary, after the several laminations have been assembled in proper superimposed relationship, to apply heat and pressure to the resulting "sandwich" in order to obtain a satisfactory bond. This is preferably accomplished by placing the sandwich in an autoclave and there subjecting it to the action of a heated fluid under pressure.

The pressure system, which has heretofore been ordinarily used with this type of pressing medium, consists of an autoclave within which the sandwiches to be treated are received and an auxiliary tank adapted to contain a reserve supply of liquid for the autoclave. The auxiliary tank is connected with the autoclave in a manner to permit the free flow of liquid therebetween and is so positioned relative thereto that when the liquid within the system is not under pressure the normal level of liquid in the autoclave will be somewhat below the top thereof.

With such a system, after the sandwiches to be treated are introduced into the autoclave and the cover closed, air under pressure is pumped into the auxiliary tank until sufficient liquid has been forced therefrom into the autoclave to fill the latter and the required amount of fluid pressure has been built up therein. The fluid pressure is maintained for a desired length of time necessary to properly press the sandwiches, after which the compressed air is exhausted from the auxiliary tank. As the pressure is released, a portion of the liquid in the autoclave will flow back into the auxiliary tank as it seeks its natural level, thus lowering the level of the liquid in the autoclave.

Such a system and method of operation is, however, not entirely satisfactory because of the fact that it is necessary to exhaust from the auxiliary tank the compressed air which has been built up for the pressing of a particular group of sandwiches before these sandwiches are removed from the autoclave. Since it is therefore necessary to build up a similar volume of air each time the autoclave is charged with a new group of sandwiches, it will be evident that the mechanical energy necessary to build up the required pressure of air will be completely lost each time the air is exhausted.

In addition, with a system of this type, the level to which the liquid in the autoclave will fall when the pressure thereon is released is dependent entirely upon the amount of liquid in the system. For this reason, it is practically impossible to accurately determine or control this level because the volume of liquid within the pressure system is constantly fluctuating due to the natural losses incident to the operation thereof and to the addition of new liquid from time to time to compensate for such losses.

In its broad aspect, the present invention comprehends the provision of an improved pressure system which includes an autoclave adapted to contain a suitable liquid and within which the sandwiches to be pressed are received, together with a closed auxiliary supply tank associated with the autoclave and containing additional liquid backed up by an elastic or gaseous fluid such as air under pressure. In carrying out the invention, the sandwiches to be pressed are first introduced into the autoclave after which the cover thereof is closed and locked. Communication is then established between the autoclave and the auxiliary tank and, with the autoclave filled with liquid, the air pressure within the auxiliary tank, acting through the liquid therein, will build up the desired pressure in the autoclave.

When the pressure upon the liquid in the autoclave has been maintained for a sufficient length of time necessary to properly bond the various laminations of the sandwiches together, communication between the autoclave and auxiliary tank is cut off and the pressure within the autoclave released. The cover of the autoclave is then opened to permit the removal of the laminated sheets and the subsequent introduction of new work.

In a somewhat more limited aspect, the invention also comprehends the use of a surge tank associated with the autoclave and auxiliary tank for receiving a portion of the liquid from the autoclave when communication between the autoclave and auxiliary tank is cut off, the liquid subsequently passing from the surge tank to the auxiliary tank from which it is returned to the autoclave.

With such an arrangement and method of operation, it will not be necessary to exhaust the air or other elastic or gaseous fluid under pressure from the system and more particularly from the auxiliary tank at any time, but instead this fluid will be retained within the system and will be used repeatedly in the treatment of successive charges of work as they are introduced into the autoclave.

An important object of the invention is the provision, in a pressure system of the above character, of means for causing the liquid within the autoclave to fall to a desired predetermined level upon release of the pressure therein and for also preventing the liquid from rising above said level upon the subsequent introduction of new work into the autoclave and before the application of pressure thereto.

Another object of the invention is the provision, in a pressure system of the above character, of means for automatically maintaining the pressure of the air or other elastic or gaseous fluid in the system and more particularly in the auxiliary tank within certain predetermined limits at all times.

Another object of the invention is the provision, in a pressure system of the above character, of means for automatically maintaining a proper amount of pressing liquid within the system at all times during the operation thereof.

Still another object of the invention is the provision, in a pressure system of the above character including an autoclave, of means associated with said pressure system and operable by pressing liquid therefrom for opening and closing the cover of the autoclave, together with means also connected with the pressure system and operable by pressing liquid therefrom for moving said cover into locked and unlocked positions.

Further objects and advantages of the invention will become more apparent during the course of the following description when taken in connection with the accompanying drawings.

In the drawings wherein like numerals are employed to designate like parts throughout the same.

Fig. 6 is a transverse sectional view through the valve in the pipe line connecting the autoclave and surge tank;

Figure 1:
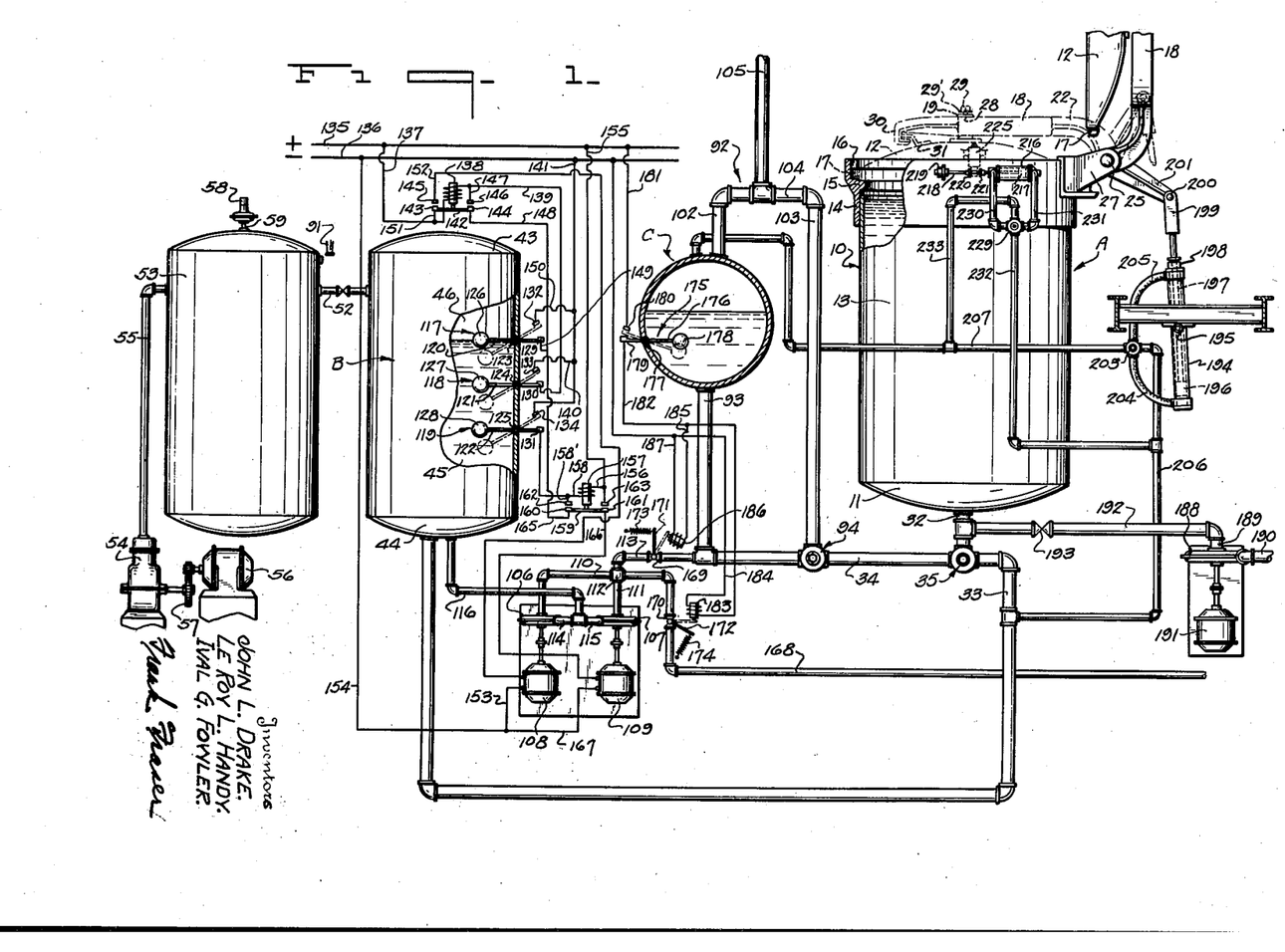
Fig. 1 is a diagrammatic view of a pressure system constructed in accordance with the present invention, portions of the apparatus being broken away.

Referring now more particularly to Fig. 1 of the drawings, the improved pressure system as herein illustrated comprises primarily an autoclave A containing a suitable pressing liquid within which the sandwiches to be pressed are adapted to be received; an auxiliary tank B associated with the autoclave A and containing additional liquid backed up by an elastic or gaseous fluid such as air under pressure; and a surge tank C associated with the autoclave A and the auxiliary tank B and into which the surplus liquid from the autoclave is adapted to flow upon the release of the pressure therein. The autoclave A, auxiliary tank B and surge tank C are all connected together by suitable piping in a manner and for a purpose to be more clearly hereinafter set forth.

The autoclave A (Figs. 1, 2 and 3) comprises a substantially cylindrical body portion 10 having a curved bottom 11 and a hingedly mounted, dome-shaped top or cover 12. The body portion 10 includes a cylindrical shell 13 provided with a collar 14 fitting snugly upon the upper portion thereof and extending thereabove. The collar 14 is provided intermediate its ends with an inwardly directed annular flange 15 upon which the cover 12 is adapted to rest when in closed position.

Figure 2:
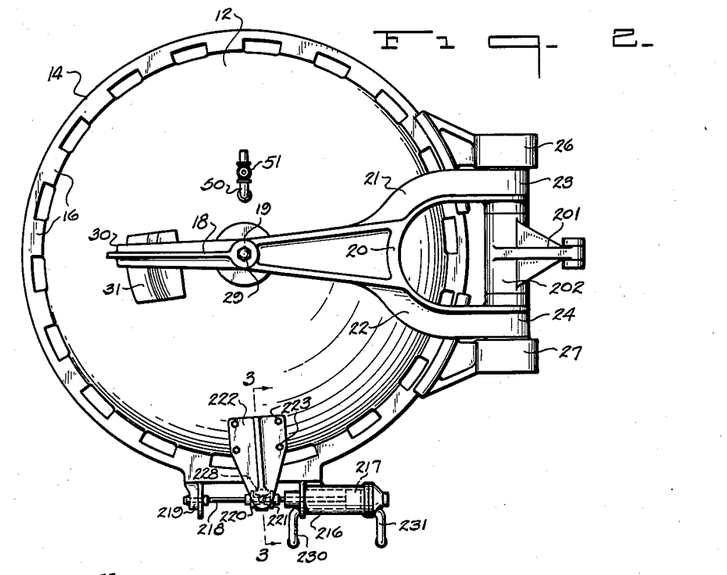
Fig. 2 is a plan view of the autoclave with the cover thereof closed.
Figure 3:
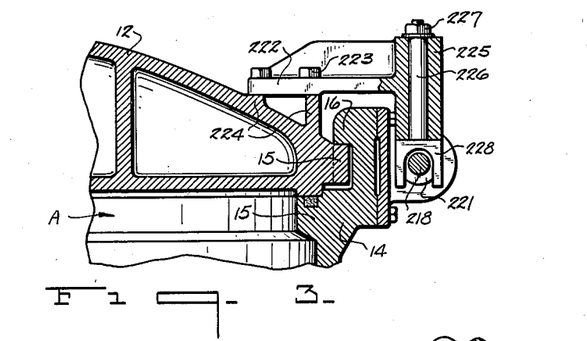
Fig. 3 is a fragmentary vertical sectional view taken substantially on line 3—3 of Fig. 2.

Formed adjacent the upper edge of this collar 14 and extending inwardly therefrom are a plurality of equally spaced retaining lugs 16 which are adapted to cooperate with a plurality of corresponding lugs 17 formed upon the outer perimeter of the domed cover 12 to provide a locking means for the said cover. The adjacent retaining lugs 16 are spaced sufficiently far apart to allow the lugs 16 to pass therebetween when the cover 12 is lowered into closed position and upon subsequent rotation of the cover, the lugs 16 thereon will be slid beneath the retaining lugs 16 to securely lock the cover in position.

The cover 12 is hingedly mounted upon the autoclave A by means of a bracket arm 18 formed with a boss 19 intermediate its ends and having a rearwardly extending bifurcated portion 20 comprising a pair of curved arms 21 and 21 terminating in the horizontally arranged bearing portions 23 and 24 respectively disposed at right angles to the bracket arm 18. The bearing portions 23 and 24 are received upon and keyed to a transverse rod 25, the opposite ends of which are journaled in a pair of bearing brackets 26 and 27 secured to the collar 14.

The cover 12 is connected to the bracket arm 18 by a rod 28 extending upwardly from the center of the cover through the boss 19 of the bracket arm and threaded at its upper end to receive a flanged nut or the like 29. A further connection between the bracket arm and cover is provided by means of a downwardly extending hook portion 30 formed at the outer end of the said bracket arm and which is adapted to engage a catch plate 31 secured to the cover 12.

It will be noted that when the cover is in closed position as illustrated by the broken lines in Fig. 1, the hook portion 30 is spaced slightly below the catch plate 31 and by proper adjustment of the nut 29, a similar amount of clearance may be provided between the flanged portion 29' thereof and the boss 19. Thus, when the cover 12 is in closed position, it will not be supported by the bracket arm 18 but will rest upon the flange 15 formed on the collar 14 and may therefore be freely rotated into locked or unlocked position. With the cover in unlocked position, when the bracket arm 18 is pivoted upwardly the hook 30 and the boss 19 formed on the bracket arm will engage catch plate 31 and nut 29 respectively to move the cover 12 into open position as shown in full lines in Fig. 1.

During the pressing operation, the cover 12 of the autoclave will be closed and locked and the autoclave will be filled with liquid under pressure. However, upon the release of the pressure within the autoclave and prior to the opening of the cover 12, it is desired that the level of the liquid within the autoclave be caused to fall to a point somewhat below the top thereof to prevent spilling of the liquid during discharging and charging of the work.

In order to permit the filling of the autoclave with liquid preparatory to the application of pressure and also to permit the subsequent discharge of a portion of the liquid from the autoclave upon release of the pressure thereon, there is provided a combined inlet and discharge pipe 32 communicating with the autoclave A through the bottom 11 thereof. This pipe 32 is connected to a pipe 33 leading from the auxiliary tank B and to a similar pipe 34 leading to the surge tank C by means of a three-way valve 35 (Fig. 1). This valve 35, as illustrated in conventional fashion in Fig. 4, comprises a substantially cylindrical outer casing 36 within which is journaled a central core 37. The core 37 is provided with a pair of connecting passages 38 and 39 extending radially from the center thereof and at right angles to each other. These passages are adapted to communicate, upon proper rotation of the core 37, with the circumferentially aligned ports 40, 41 and 42 tapped through the wall of the outer casing 36 and which receive the threaded ends of pipes 32, 33 and 34 respectively.

As illustrated in Fig. 1, the auxiliary tank B is of cylindrical formation, having a rounded top 43 and a rounded bottom 44 within which is received one end of the pipe 33 leading to the autoclave A. The lower portion of the auxiliary tank B contains a reserve supply of liquid 45 for the autoclave and which liquid is backed up by an elastic fluid, such as air under pressure contained in the space 46 thereabove.

Figure 4:
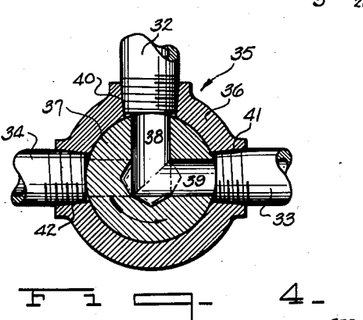
Fig. 4 is a transverse sectional view through a valve in the pipe line connecting the autoclave with the auxiliary tank and surge tank.

When the sandwiches to be treated have been introduced into the autoclave and the cover 12 thereof closed and locked, the core 37 of the valve 35 will be turned to the position shown in full lines in Fig. 4, thereby establishing communication between the auxiliary tank B and the autoclave A through pipe 33, passages 39 and 38, and pipe 32. The air under pressure within the auxiliary tank will then act to force sufficient liquid therefrom into the autoclave to first fill the same and to then apply the required amount of pressure to the liquid therein.

In order to permit the air, trapped above the liquid in the autoclave when the cover 12 is closed, to escape as the autoclave is being filled with liquid and to subsequently facilitate the release of pressure within the autoclave, there is provided a vent pipe 50 communicating with the top of the autoclave through the cover 12 and equipped with a shut-off valve 51. The valve 51 is left open during the filling of the autoclave until all of the air is exhausted and is closed when liquid begins coming out of the vent pipe 50.

Communicating with the upper portion of the auxiliary tank B by means of a pipe 52 is a compressed air tank 53. The pipe 52 permits the free flow of air between the space 46 of the auxiliary tank and the compressed air tank 53, thus equalizing the pressure within the two tanks and providing in effect a relatively large volume of compressed air above the liquid 45 in the auxiliary tank. This increased volume of air will act to reduce the fluctuation of pressure resulting from variations in the level of the liquid in the auxiliary tank during the application of pressure to the liquid in the autoclave.

Compressed air is introduced into the system by means of an air compressor 54 communicating with the tank 53 through a pipe 55 and operable by a motor 56 having suitable driving connection with the air compressor 54 through a train of gears or the like 57. When the required amount of air has been introduced into the system, it is retained therewithin and is used again and again in the application of pressure to successive charges of work within the autoclave A.

The amount of pressure most suitable for properly bonding together the various laminations of the sandwiches in manufacturing laminated safety glass has been found to be approximately 250 pounds per square inch. Although some variation in the amount of pressure is permissible it is desired, in order to obtain uniform, satisfactory results, that the pressure within the system be maintained within certain definite limits. For example, between 250 and 300 pounds per square inch.

In order to prevent the compressed air within the system from falling below the minimum required pressure due to natural losses of air or as a result of abnormal operating conditions, it may be necessary to supply additional air to the system from time to time. For this purpose, there has been provided an automatic pressure control means designated in its entirety by the numeral 58 and communicating with the upper portion of the tank 53 by means of a pipe 59.

Figure 5:
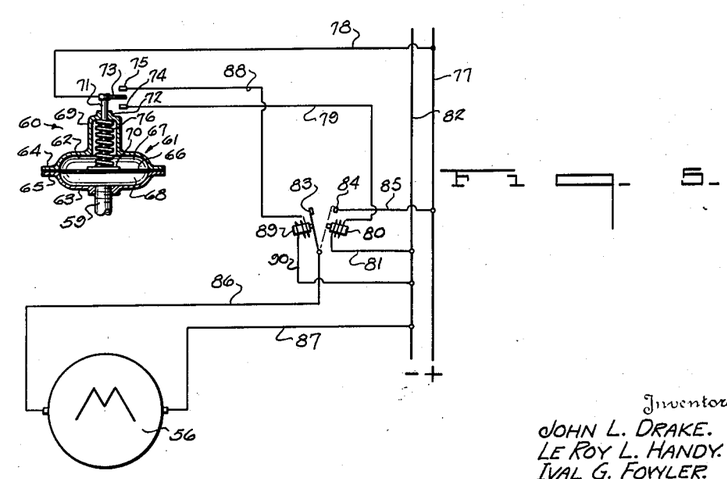
Fig. 5 is a vertical sectional view through the automatic switch which controls the pressure of the elastic fluid within the system together with a wiring diagram of the control therefor.

As best shown in Fig. 5, this automatic control means 58 includes a pressure responsive switch 60 associated with the electrical supply line leading to the motor 56. The switch 60 comprises a two piece hollow casing 61 including the upper and lower oppositely disposed, substantially dish shaped portions 62 and 63 respectively. The portions 62 and 63 are provided with annular flanges 64 and 65 respectively between which is clamped a flexible diaphragm 66 dividing the interior of the hollow casing 61 into upper and lower chambers 67 and 68 respectively. Extending upwardly from the center of the upper portion 62 is a cylindrical extension 69 in open communication with the upper chamber 67 while the lower portion 63 is tapped centrally thereof to receive the threaded upper end of the pipe 59 which connects the lower chamber 68 with the tank 53.

Mounted upon the upper surface of the diaphragm 66 at its center is a plate 70 carrying the vertical rod 71 extending upwardly through the extension 69 and slidably mounted in a bearing 72 formed at the upper end thereof. Carried at the upper end of the rod 71 is a horizontal contact arm 73 which is adapted to engage stationary contacts 74 and 75 upon vertical movement of said rod.

In order to counteract the pressure of the air within the lower chamber 68 and to normally maintain the rod 71 stationary, there is provided a compression spring 76 encircling the rod 71 between the plate 70 and the bearing 72. The spring 76 is capable of resisting pressures up to 300 pounds per square inch upon the under surface of the diaphragm and capable of overcoming pressures below 250 pounds per square inch. In other words, with the air pressure in the chamber 68 between 250 and 300 pounds per square inch, the diaphragm 66 and the rod 71 will be practically stationary. However, if the pressure in said chamber falls below 250 pounds per square inch, the spring 76 will cause the rod 71 to move downwardly while if the pressure rises above 300 pounds per square inch, the diaphragm 66 and rod 71 will be moved upwardly against the action of the spring 76 by the pressure of the air in the lower chamber 68.

It is believed that the operation of the automatic pressure control means will be more clearly understood by reference to the wiring diagram in Fig. 5. This diagram includes three circuits, namely, two actuating circuits and a motor operating circuit. As shown in this view, the contact arm 73 is midway between the stationary contacts 74 and 75 and the motor 56 is stopped. During operation of the system, whenever the pressure in the tank 53 and consequently the pressure in the lower chamber 68 of the switch 60 falls below 250 pounds per square inch, the rod 71 will be moved downwardly as described above until the contact arm 73 engages the lower stationary contact 74. This will complete one of the actuating circuits by permitting electrical current to flow from the positive main line 77 through wire 78, arm 73, contact 74, and wire 79 to the solenoid 80 and out through wire 81 to the negative line 82.

The flow of current through the actuating circuit in this manner energizes the solenoid 80 and causes a switch 83 to be moved into closed position to engage a stationary contact 84 as indicated in broken lines. The closing of the switch 83 will complete the motor operating circuit, thus permitting electric current to flow from the positive line 77 though wire 85 contact 84, switch 83, and wire 86 to the motor 56 and out through wire 87 to the negative line 82. The flow of current through the motor operating circuit as described serves to energize the motor 56 to drive the air compressor 54 and thus force air under pressure into the tank 53 through the pipe 55. As the pressure of the air in the chamber 68 of the pressure responsive switch 60 increases, it overcomes the action of the spring 76, thus raising the contact arm 73 on the rod 71 out of engagement with the contact 74 to break the actuating circuit through the solenoid 80. The switch 83, however, remains in engagement with contact 84 and the motor 56 continues to operate until the rod 71 is moved far enough upwardly to bring the arm 73 into engagement with the upper contact 75 to complete the second actuating circuit.

The completion of this second actuating circuit permits the electric current to flow from the positive main line 77 through wire 78, arm 73, contact 75 and wire 88 to a solenoid 89 and out through wire 90 to the negative line 82. The flow of current through the second actuating circuit in this manner will energize the solenoid 89 and cause the switch 83 to move to the left out of engagement with the contact 84 and into open position as shown in full lines thus breaking the motor operating circuit and stopping the motor 56. Upon any subsequent reduction of pressure within the system to below the minimum requirement, the rod 71 will again be moved downwardly by the action of the spring 76 to bring the contact arm 73 into engagement with the stationary contact 74 whereupon the above cycle will be repeated.

The automatic pressure control means 58 will thus serve to maintain the air pressure within the system above the required minimum at all times and by the further provision of a safety valve 91 also communicating with the tank 53 and adapted to open in the event that the pressure within the system rises above the desired maximum, it will be seen that the pressure of the compressed air within the system will always be maintained within certain definite predetermined limits.

When the pressure upon the liquid within the autoclave A has been maintained for a length of time sufficient to properly press the sandwiches contained therein, the valve 35 is turned 90 degrees in the direction of the arrow in Fig. 4 to move the core 37 into the position indicated in broken lines whereby to cut off communication between the said autoclave and auxiliary tank B. The valve 51 in the vent pipe 50 is then opened to release the pressure within the autoclave and to permit the entrance of air. The turning of the valve 35 will bring the passages 38 and 39 into registry with the pipes 34 and 32 respectively, thereby not only cutting off communication between the autoclave and auxiliary tank but simultaneously establishing communication between the autoclave and surge tank C to permit a portion of the liquid within the autoclave to discharge into the surge tank.

As illustrated in Fig. 1 of the drawings, the surge tank C, associated with the autoclave A, is of substantially cylindrical formation, being preferably arranged in a horizontal position and somewhat below the desired normal level of liquid in the autoclave. The surge tank C is provided with an inlet conduit, designated in its entirety by the numeral 92, which communicates with the upper portion of the surge tank and a combined inlet and outlet pipe 93 received within an opening in the lower portion thereof. The pipes 92 and 93 are connected to the common conduit or pipe 34 leading from the autoclave A by means of a three-way valve 94.

The valve 94, as best shown in Fig. 6, is somewhat similar to valve 35 and comprises a substantially cylindrical outer casing 95 within which is arranged a rotatable core 96. The core 96 is provided with a transverse passage 97 extending therethrough and communicating with an intersecting radially extending passage 98 disposed at right angles thereto. The passages 97 and 98 are adapted to register, upon proper rotation of the core 96, with the circumferentially aligned ports 99, 100 and 101 tapped through the wall of the casing 95 and which receive the threaded ends of pipe 34, conduit 92 and pipe 93 respectively. The core 96 of the valve 94 is normally in the position shown in Fig. 6, with the passages 97 and 98 in registry with the ports 100 and 99 respectively, thus placing the pipe 34 in open communication with the conduit 92.

When the pressure within the autoclave has been maintained for the proper length of time, the core 37 of the valve 35 is turned 90 degrees in the direction of the arrow to bring the passages 38 and 39 into registry with the ports 42 and 40 respectively, and the valve 51 in the vent pipe 50 is then opened to permit air to flow into the autoclave. This will permit a portion of the liquid within the autoclave seeking its normal level to flow through pipe 32, passages 39 and 38, pipe 34, valve 94 and conduit 92 to the surge tank C, thus causing the liquid level in the autoclave to fall and permitting the cover to be opened without spilling any of the liquid.

As pointed out above, in the normal operation of the system, it is desirable to have the liquid in the autoclave fall to a predetermined level upon the release of the pressure thereon and also to prevent the liquid from rising above this level during the subsequent recharging of the autoclave. To this end, the conduit 92 is in the shape of a so-called goose neck and comprises a pair of vertical pipes 102 and 103 connected together by a horizontal pipe 104 having an upwardly extending vent pipe 105 interposed therein. The horizontal pipe 104 is positioned at the height to which it is desired that the level of the liquid in the autoclave will fall upon release of the pressure thereupon.

Thus, when the pressure upon the liquid in the autoclave is released by turning the valve 35 and opening the valve 51, the liquid, seeking its normal level, will flow from the autoclave A to the surge tank C through the goose neck 92. This flow of liquid will continue until the liquid level in the autoclave falls to the height of the horizontal pipe 104 and regardless of variations in the amount of liquid in the system, the level of liquid in the autoclave will always fall to this point and no farther upon release of the pressure thereupon.

Further, in the event that a charge of work subsequently introduced into the autoclave is such that it will displace a larger amount of liquid than the preceding charge, this will not result in raising the level of the liquid but will merely cause an additional amount of liquid to flow into the surge tank C. It will be readily seen, therefore, that this feature will practically eliminate overflowing of the liquid during recharging of the autoclave and, in addition, will permit of a relatively high and constant normal level being maintained.

As just described, the autoclave normally discharges into the surge tank C through the goose neck 92. However, under certain circumstances, it may be desired to obtain a "quick dump" of the autoclave or, in other words, to cause the level of the liquid therein to fall considerably below the point determined by the position of the horizontal pipe 104 in the goose neck 92. In this event, the core 96 of the valve 94 is rotated 90 degrees in the direction of the arrow in Fig. 6 to bring the opposite ends of the transverse passage 97 into registry with the ports 99 and 101. This will permit the liquid from the autoclave, discharging through pipe 32, valve 35 and pipe 34 to flow into the surge tank C through valve 94 and pipe 93, which flow will continue until the level of the liquid within the autoclave A and surge tank C are equalized.

For the purpose of preventing excessive fluctuation of pressure within the system, it is important that the liquid in the auxiliary tank B be maintained at a relatively contant level. To this end, it is necessary, during operation of the system, to replace the liquid which is forced from the auxiliary tank into the autoclave preparatory to the application of pressure to the liquid in the autoclave. Since a corresponding amount of liquid is subsequently permitted to flow from the autoclave into the surge tank C upon the release of pressure within the autoclave, this replacement is preferably effected by transferring liquid to the auxiliary tank from the surge tank.

To accomplish this transfer of liquid from surge tank C to auxiliary tank B, there is provided a pair of centrifugal pumps 106 and 107 operated by the motors 108 and 109 respectively, having suitable driving connections therewith. The respective inlet pipes 110 and 111 of the pumps 106 and 107 are connected to the surge tank C by means of a four-way fitting 112, common conduit 113 and pipe 93, while the respective outlet pipes 114 and 115 of the said pumps 106 and 107 are connected to the bottom of the auxiliary tank B by means of a common conduit 116.

As explained above, pressure is applied to the liquid in the autoclave A by means of the compressed air contained in the space 46 above the liquid 45 in the auxiliary tank B and acting therethrough. Since it is desired that the amount of air within the system be normally constant and that no further air be added to or removed therefrom, it will be evident that the size of the space 46 and consequently the height of the liquid 45 will have a definite relation to the amount of pressure in the system. For this reason, it is extremely important that the level of the liquid 45 be accurately controlled. In other words, the level of the liquid 45 must never fall below the point where the increased size of the space 46 will result in the pressure of the air therein falling below 250 pounds per square inch, nor must the level of the liquid 45 rise beyond the point where the reduced size of the space 46 will act to compress the air therein to a pressure above 300 pounds per square inch.

In order to maintain the level of the liquid 45 within the limits set forth above, there is associated with the electrical circuit for the motors 108 and 109 of the pumps 106 and 107 respectively, three float switches 117, 118 and 119 associated with the auxiliary tank B and operable into open and closed position by the fluctuations of the level of the liquid 45 therein. The float switches 117, 118 and 119 comprise arms 120, 121 and 122 respectively pivoted midway their ends in the side wall of the auxiliary tank B as at 123, 124 and 125. The inner ends of the arms 120, 121 and 122 of the float switches extend into the tank B and have secured thereto the floats 126, 127 and 128 respectively while the outer ends of the arms extend exteriorly of the tank and carry thereon the electrical contacts 129, 130 and 131 respectively. The switches 117, 118 and 119 also include the stationary contacts 132, 133 and 134 respectively which are adapted to be engaged by the movable contacts 127, 128 and 129 respectively upon closing of the switches 117, 118 and 119.

The switches 117, 118 and 119 are so arranged that when the liquid 45 in the auxiliary tank B is at the maximum desired height, all of the switches will be in open position as shown in full lines in Fig. 1, and the pumps 106 and 107 will be stopped. However, when liquid is forced from the auxiliary tank B into the autoclave A, the falling of the level of the liquid 45 will cause the float switches 117 and 118 to move to closed position as shown by the broken lines, and the closing of the switch 118 will start the pump 106 pumping liquid from the surge tank C through pipes 93, 113 and 110 into the auxiliary tank B through pipes 114 and 116. This transfer of liquid from the surge tank to the auxiliary tank will cause the level of the liquid 45 to rise, thereby moving the switches 117 and 118 into open position and upon the opening of the switch 117, as the liquid reaches its maximum desired level, the pump 106 will be stopped.

In the event the liquid supplied to the auxiliary tank by the operation of the pump 106 is not sufficient to raise the level of the liquid 45, the level will continue to fall until the switch 119 is also moved into closed position and the closing of this switch will start the pump 107 pumping additional liquid from the surge tank C into the auxiliary tank through pipes 93, 113 and 111, pump 107 and pipes 114 and 116. Both the pump 106 and pump 107 will then continue to operate until the liquid 45 rises to its maximum level, thus opening the switches 119 and 118 and finally the switch 117 which will stop both pumps.

It is believed that the electrical control of the pumps 106 and 107 by the switches 117, 118 and 119 will be more readily understood by reference to the wiring diagram therefor which is also illustrated in Fig. 1. Considering first the control of the pump 106 by the switches 117 and 118, the wiring therefor consists of three circuits, namely, (1) an actuating circuit, (2) a holding circuit, and (3) an operating circuit. The actuating circuit includes the positive and negative main lines 135 and 136 respectively. Leading from the positive line 135 is a wire 137 running to a solenoid 138 and leading from this solenoid is a wire 139 which is connected to the movable contact 130 of the switch 118. A wire 140 leads from the stationary contact 133 of the switch 118 and is connected to a wire 141 running to the negative line 136.

The lowering of the level of the liquid 45 in the auxiliary tank B will first cause the switch 117 to be moved to closed position, thus causing the movable contact 129 thereof to engage the stationary contact 132 and subsequently the switch 118 will also be closed, thus bringing its movable contact 130 into engagement with the stationary contact 133. The closing of the switch 118 completes the actuating circuit by permitting electric current to flow from the positive line 135 through wire 137 to the solenoid 138 and out through wire 139, contacts 130 and 133 of the switch 118, wire 140 and wire 141 to the negative line 136.

Associated with the solenoid 138 is a bar 142 which carries a pair of movable contacts 143 and 144. Upon energization of the solenoid 138 by the flow of current therethrough in the manner just described, the bar 142 will be moved to bring the contacts 143 and 144 into engagement with a pair of stationary contacts 145 and 146 respectively, thus completing both the holding circuit and the operating circuit.

The completion of the holding circuit permits electric current to flow from the positive line 135 through wire 137 to the solenoid 138 and then out through wire 147, contacts 146 and 144, wires 148 and 149, contacts 129 and 132 of the switch 117 and wires 150 and 141 to the negative line 136.

When the bar 142 is moved to complete the holding circuit, it also acts to simultaneously complete the operating circuit. The completion of the operating circuit will permit electric current to flow from the positive line 135 through the wires 137 and 151, contacts 143 and 145 and wire 152 to the motor 108 and out through the wires 153 and 154 to the negative line 136, thus energizing the motor 108 to start the pump 106. Liquid will then be pumped from the surge tank C through the pump 106 into the auxiliary tank B to replace the liquid being forced therefrom. As the level of the liquid 45 rises in the auxiliary tank, it will first open the switch 118 and then the switch 117. The flow of current through the holding circuit as above described will serve to maintain the solenoid 138 energized and the operating circuit completed when the switch 118 is opened to break the actuating circuit. In other words, the breaking of the actuating circuit does not break the holding circuit or the operating circuit and therefore does not affect the operation of the pump 106 which will continue to pump liquid into the auxiliary tank until the level of the liquid therein is raised to a point where it will open the switch 117. The opening of the switch 117 will then break the holding circuit, thus deenergizing the solenoid 138 and causing downward movement of the bar 142 to break the operating circuit to the motor 108, thereby stopping the pump 106.

As pointed out above, in the event that the liquid supplied to the auxiliary tank by the operation of the pump 106 is insufficient to cause the level of the liquid 45 to rise, the said level will continue to fall until the switch 119 is moved into closed position to start the pump 107. The electrical means for controlling the operation of the pump 107 by the switches 119 and 117 is substantially the same as that for controlling the operation of the pump 106 by the switches 118 and 117. Thus, the wiring diagram for this purpose also comprises an actuating circuit, a holding circuit, and an operating circuit.

Upon closing of the float switch 119, the operating circuit will be completed to allow electric current to flow from the positive line 135 through wires 155 and 156 to a solenoid 157 and out through wire 158, contacts 131 and 134 and wire 141 to the negative line 136. The completion of the actuating circuit will energize the solenoid 157 and cause the movement of the bar 159 associated therewith to bring the movable contacts 160 and 161 carried thereby into engagement with a pair of stationary contacts 162 and 163 respectively to complete the holding and operating circuits.

The completion of the holding circuit will permit electric current to flow from the positive line 135 through wires 155 and 156 to the solenoid 157 and out through wires 158 and 158′, contacts 162 and 160, wires 165 and 149, contacts 129 and 132 of switch 117, and wires 150 and 141 to the negative line 136. It will of course be apparent that at any time the switch 119 is closed, the switches 117 and 118 are also closed.

The completion of the holding circuit also effects the simultaneous completion of the operating circuit. The completion of the operating circuit will permit the flow of current from the positive line 135 through wire 155, contacts 163 and 161 and wire 166 to the motor 109 and out through wire 167 to the negative line 136, thus energizing the motor 109 and starting the pump 107.

Since the pump 106 will be already in operation at this time, the starting of the pump 107 will serve to force additional liquid from the surge tank C into the auxiliary tank B. As the level of the liquid in the auxiliary tank rises, it will first open the float switch 119, then the switch 118, and finally the switch 117. The opening of the float switch 119, while breaking the actuating circuit, will not affect the holding and operating circuits due to the fact that the solenoid 157 will remain energized. The opening of the switch 118 will also not affect either of these circuits. However, as the switch 117 is opened, it will break both of the holding circuits, thus deenergizing the solenoids 138 and 147 and causing movement of the bars 142 and 159 respectively associated therewith to disengage the movable contacts carried thereby from their respective stationary contacts. The breaking of the holding circuits will also effect the breaking of the operating circuits to the motors 108 and 109, thereby stopping the pumps 106 and 107.

From the above, it will be seen that there has been provided an automatic control means for maintaining the level of liquid in the auxiliary tank B within certain definite predetermined limits at all times and that upon the lowering of the liquid level therein to a certain point, one or both of the pumps 106 and 107 will be immediately started to transfer liquid from the surge tank C to the auxiliary tank and that such transfer will continue until the level of the liquid within the auxiliary tank reaches its maximum desired height. It will be understood that the electrical control means for the pumps as herein illustrated are purely diagrammatic and that changes and alterations might be made in actually practicing the invention.

For example, in the event it is desired to maintain the level of the liquid in the auxiliary tank B within somewhat closer limits, the float switches 117, 118 and 119 might be positioned closer to one another or the switch 119 might be entirely eliminated and both of the pumps 106 and 107 be started by the closing of the switch 118 and stopped by the opening of the switch 117.

As set forth, it is preferred that the liquid forced from the auxiliary tank B be replaced by transferring liquid thereto from the surge tank C. However, in the event that due to natural losses or for any other reason there is not a sufficient amount of liquid in the surge tank for this purpose, it becomes necessary to supply additional liquid to the system. For this purpose, there is connected to the intake pipes 110 and 111 of the pumps 106 and 107 respectively, by means of the four-way fitting 112, a pipe 168 leading from a reserve supply tank (not shown).

The pipe 113 leading from the surge tank C and the pipe 168 are provided with shut-off valves 169 and 170 respectively operable by the respective lever arms 171 and 172. During normal operation, the valve 169 is maintained in open position and the valve 170 in closed position by means of tension springs 173 and 174 respectively connected to the outer ends of the respective lever arms 171 and 172. With this arrangement, upon operation of the pumps 106 and 107, liquid will be pumped from the surge tank C into the auxiliary tank B as described above. However, when it becomes necessary to supply additional liquid to the system due to the fact that the level of the liquid in the surge tank falls below a predetermined point, there is provided means automatically actuated for closing the valve 169 in the pipe 113 and opening the valve 170 in supply pipe 168. This permits liquid to be pumped from the reserve tank through the pipe 168, fitting 112, pipes 110 and 111, pumps 106 and 107, pipes 114 and 115 and common conduit 116 into the auxiliary tank B.

The means for automatically effecting this operation includes a float switch 175 associated with the surge tank C and comprising an arm 176 pivoted midway its ends in the side wall of the surge tank as at 177. The arm 176 carries at one end thereof interiorly of the surge tank a float 178 and at its opposite end outwardly of the tank an electrical contact 179 which is adapted to engage a stationary contact 180.

It is believed that the automatic control of the valves 169 and 170 will be more readily understood by reference to the electrical wiring diagram therefor as illustrated in Fig. 1. The electrical wiring consists of a single circuit which includes the main positive and negative lines 135 and 136. Leading from the positive line 135 is a wire 181 connected to the stationary contact 180 and running from the contact 179 of the float switch 175 is a wire 182 connected to a solenoid 183. A wire 184 leads from the solenoid 183 and is connected to the negative line 136. Leading from the wire 182 is a wire 185 running to a second solenoid 186 and leading from this solenoid is a wire 187 which is connected to the wire 184.

When the level of the liquid in the surge tank C falls sufficiently to cause the float 178 to drop to the position indicated in broken lines, the float switch 175 will be moved into closed position. The closing of the switch 175 will bring the contact 179 on the arm 176 into engagement with the stationary contact 180, thus completing the circuit. The completion of the circuit will cause electric current to flow from the positive line 135 through wire 181, contacts 180 and 179 and wire 182 to the solenoid 183 and out through wire 184 to the negative line 136. A portion of the current will also flow from the wire 182 through wire 185 to the solenoid 186 and out through wire 187 and wire 184 to the negative line 136.

The flow of current in the manner described will energize both of the solenoids 186 and 183 which will cause the lever arms 171 and 172 respectively of the valves 169 and 170 to move against the action of the springs 173 and 174 into the positions indicated by the broken lines. This movement of the lever arms 171 and 172 will close valve 169 and open valve 170, thus causing liquid to be pumped from the reserve tank into the auxiliary tank B upon operation of either one or both of the pumps 106 and 107.

The valves 169 and 170 will remain in this position until the continued operation of the system results in sufficient liquid being discharged from the autoclave A into the surge tank C to cause the level of the liquid in the surge tank to rise sufficiently to move the float 178 into full line position, thus opening the switch 175. Upon opening of the switch 175, the contact 179 will be disengaged from contact 180, thus breaking the circuit and deenergizing the solenoids 186 and 183. The lever arms 171 and 172 of the valves 169 and 170 respectively will then be moved into full line position by the action of the respective springs 173 and 174 to open the valve 169 and close the valve 170 whereupon the normal cycle of operations will be resumed.

Under certain circumstances, such as for example when it is desired to clean the autoclave, it may be necessary to discharge all of the liquid therefrom. To this end, there is associated with the autoclave a centrifugal pump 188 having inlet and outlet pipes 189 and 190 respectively and operable by a motor 191 having suitable driving connection therewith. The inlet pipe 189 is connected with the pipe 32, communicating with the bottom of the autoclave, by means of a pipe 192 having a shut-off valve 193 arranged therein while the discharge pipe 190 leads to a reserve tank (not shown).

The valve 193 is normally closed but by turning this valve to open position and starting the pump 188, all of the liquid may be readily discharged from the autoclave into the reserve tank. Further, by proper manipulation of the valves 35 and 94 during operation of the pump 188, the liquid may be discharged from the entire system if desired.

As set forth above, the present invention also contemplates the provision of hydraulic means connected to the pressure line of the system and operable by liquid therefrom for closing and opening the cover 12 of the autoclave together with similar means operable in a like manner for moving the cover into and out of locked position.

The means for closing and opening the cover 12 includes a cylinder 194 (Fig. 1) swingably mounted between a pair of I-beams as at 195. Mounted within the cylinder 194 is a piston 196 to which is connected the lower end of a piston rod 197 operating through a stuffing box 198 at the upper end of the cylinder. The upper end of the piston rod 197 is pivotally connected, by means of a coupling 199 and pin 200, with a lever arm 201 formed on a sleeve 202 which is keyed to the transverse rod 25 carrying bracket arm 18.

To permit the introduction of liquid under pressure into the cylinder 94 for the purpose of closing and opening the cover 12 of the autoclave A, the lower and upper ends of the cylinder are adapted to communicate with a four-way valve 203 by means of a pair of flexible conduits 204 and 205. Also connected to the valve 203 is an inlet pipe 206 leading from the pipe 33 of the pressure system and an outlet pipe 207 leading to the surge tank C.

Figure 7:
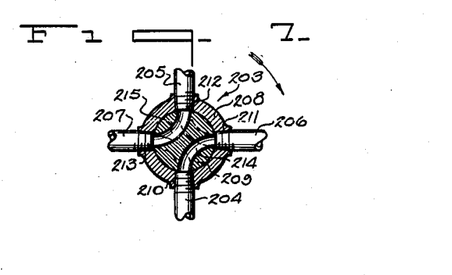
Fig. 7 is a transverse sectional view through the valve which controls the opening and closing of the autoclave cover.

The four-way valve 203 may be of any conventional or preferred construction and, as shown in Fig. 7, comprises an outer casing 208 within which is journaled a core 209. The outer casing 208 is tapped at four horizontally aligned, equidistantly spaced points to form the ports 210, 211, 212, and 213 within which are received the threaded ends of the conduits 204, 206, 205 and 207 respectively. The core 209 is provided with a pair of curved passages 214 and 215 extending therethrough and the opposite ends of which are adapted to align with the ports 210 to 213 upon proper positioning of the core.

When it is desired to close the cover 12, the valve 203 is turned to the full line position as shown in Fig. 7. This will permit fluid to be forced from the pipe 33 by the action of the compressed air in the auxiliary tank through pipe 206, passage 214, and conduit 204 into the lower end of the cylinder 194 to force the piston 196 upwardly. At the same time, any liquid remaining in the upper portion of the cylinder 194 will be forced out by the upward movement of the piston and will discharge through conduit 205, passage 215, and pipe 207 to the surge tank C. The upward movement of the piston 196, acting through the piston rod 197, coupling 199, and lever arm 201, will turn the rod 25 in a counterclockwise direction to lower the bracket arm 18 and consequently the cover 12 into the position indicated by the broken lines in Fig. 1.

Upon the completion of the pressure operation, the cover 12 is adapted to be raised by turning of the core 209 of the valve 203 ninety degrees in the direction of the arrow shown in Fig. 7. This will bring the passages 214 and 215 into the positions indicated by the broken lines, and thus the passage 215 will connect the inlet pipe 206 with the conduit 205 leading to the upper end of the cylinder 194 while the passage 214 will connect the conduit 204 leading from the bottom of the cylinder with the discharge pipe 207. With this arrangement, liquid under pressure will be forced into the upper end of the cylinder 194 to move the piston 196 into lowered or retracted position and at the same time the liquid within the lower portion of the cylinder will be forced out of the cylinder and discharged into the surge tank C. The downward movement of the piston 196, acting through the various connections referred to above, will raise the cover 12 into open position indicated in full lines in Fig. 1.

When the cover 12 is moved to closed position, it is also adapted to be rotated into locked and unlocked positions by the action of hydraulic means connected to the pressure system and operable by liquid therefrom. This hydraulic means includes a cylinder 216 fixed to the outer wall of the collar 14 at one side of the autoclave A. Mounted within the cylinder 216 is a piston 217 to which is connected a piston rod 218 operating through the forward end of the cylinder and slidably mounted adjacent its outer end in a bearing 219 secured to the said collar 14. The piston rod 218 has secured thereto, between the cylinder 216 and the bearing 219, a pair of spaced apart, oppositely disposed, flanged collars 220 and 221.

In order to provide suitable connections between the hydraulic operating means and the cover 12, there is provided a bracket plate 222 secured to the cover by means of bolts 223 engaging vertical projections 224 on said cover adjacent its outer edge and at a point slightly in advance of the cylinder 216. The bracket plate 222 extends outwardly beyond the collar 14 and is formed with a vertical bearing 225 within which is journaled a rod 226 threaded at its upper end to receive a retaining nut 227 and carrying at its lower end a forked member 228. The forked member 228 is adapted to straddle the piston rod 218 between the flanged collars 220 and 221 so that upon rearward movement of the piston and piston rod, the collar 220 will engage the forked member 228 to rotate the cover 12 into locked position while upon forward movement of the piston and piston rod, the collar 221 will engage the forked member 228 to rotate the cover into unlocked position.

To provide for the introduction of liquid into the cylinder 216 in a manner to cause the operation of the piston 217, the opposite ends of the cylinder are connected to a four-way valve 229 by pipes 230 and 231 respectively. The valve 229 is also provided with an inlet pipe 232, branching from the inlet pipe 206 leading to valve 203, and a discharge pipe 233 leading to the outlet pipe 207 of valve 203.

Figure 8:
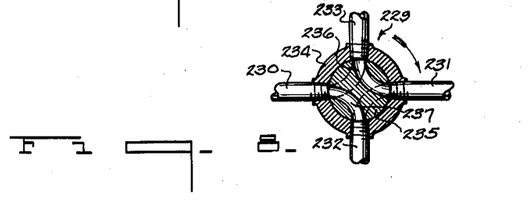
Fig. 8 is a transverse sectional view through a similar valve which controls the movement of the autoclave cover into locking and unlocking positions.

The valve 229, as shown in Fig. 8, is similar in construction and operation to the valve 203 and comprises a cylindrical outer casing 234 within which is journaled a core 235. Tapped through the walls of the casing 234 are four horizontally aligned, equally spaced ports which are adapted to receive the threaded ends of the pipes 230, 232, 231 and 233 respectively. The core 235 is provided with a pair of horizontally arranged, curved passages 236 and 237, the opposite ends of which are adapted to align with the pipes 230 to 233 in the walls of the casing 234 upon proper positioning of the core 235.

When it is desired to lock the cover 12, the valve 229 is turned to the position illustrated in full lines in Fig. 8, whereupon liquid will be forced from the pipe 33 through pipe 206, pipe 232, passage 237 and pipe 230 into the forward end of the cylinder 216 to move the piston 217 rearwardly. Simultaneously, any liquid in the rear end of the cylinder will be forced out by the movement of the piston through pipe 231, passage 236, pipe 233 and pipe 207 into the surge tank C. The rearward movement of the piston 217 and rod 218 will act as described above to rotate the cover 12 into locked position, and when in such position the lugs 17 on the cover 12 will be positioned beneath the retaining lugs 16 on collar 14.

When it is desired to unlock the cover 12 to permit it to be opened, the core 235 of valve 229 is turned ninety degrees in the direction of the arrow in Fig. 8 to cause the passages 236 and 237 to assume the positions indicated in broken lines. When moved to this position, the inlet pipe 232 will be placed in communication with the pipe 231 leading to the rear end of the cylinder 216 through passage 236, while the pipe 230 leading from the forward end of the cylinder will be connected by the passage 237 to the discharge pipe 233. Thus, liquid under pressure will be forced into the rear end of the cylinder 216 to move the piston 217 forwardly and at the same time any liquid within the forward end of the cylinder will be discharged into the surge tank C. The forward movement of the piston acting through the various connections, will cause the cover 12 to be moved into unlocked position at which time the lugs 17 on the cover will be slid from beneath the lugs 16 on collar 14.

The operation of the improved pressure system, herein provided, through one complete cycle will now be described. When the autoclave A is open as shown in full lines in Fig. 1, valve 35 in the line connecting the autoclave and auxiliary tank B will be in the position indicated by broken lines in Fig. 4. The valve 94 in the line connecting the autoclave and surge tank C will be in the position shown in full lines in Fig. 6 and the valve 51 in the vent pipe 50 will be open. The work, such as a group of sandwiches, to be treated may then be placed in suitable open containers or tubs and these tubs lowered into the liquid in the autoclave. The cover 12 of the autoclave will then be closed by turning the valve 203 to the position shown in full lines in Fig. 7, and after the cover has been closed, it will be rotated into locked position by turning the valve 229 to the position shown in full lines in Fig. 8.

With the autoclave closed and locked, the desired amount of fluid pressure is adapted to be built up therein. To this end, the valve 35 is turned to the position shown in full lines in Fig. 4 which will permit liquid from the auxiliary tank B to be forced therefrom into the autoclave A by the pressure of the air compressed within the space 46. When the autoclave is filled and liquid begins coming out of the vent pipe 50, the valve 51 is closed. During the filling of the autoclave, one or both of the pumps 106 and 107 will be automatically placed in operation by the closing of the float switches 117, 118 and 119 to replace the liquid forced from the auxiliary tank into the autoclave, by pumping fresh liquid into the auxiliary tank from the surge tank C, and if sufficient liquid is not contained in the surge tank, then by pumping liquid from the reserve tank (not shown) through the supply pipe 168.

It will thus be evident that with the valve 35 turned to full line position (Fig. 4), when the autoclave has been filled and the valve 51 closed, an amount of pressure will be applied to the liquid in the autoclave which is equal to the pressure of the compressed air within the space 46 which is preferably between 250 and 300 pounds per square inch in the manufacture of laminated safety glass. This pressure will be maintained until the several laminations of the sandwiches have been securely bonded together and which ordinarily requires approximately five minutes.

At the expiration of that time, the valve 35 will be turned to the position indicated in broken lines in Fig. 4, and the valve 51 will be opened. This will permit liquid to discharge from the autoclave A to the surge tank C through the goose-neck 92 until the level of liquid within the autoclave falls to the level of the horizontal pipe 104 in the goose-neck. The cover 12 of the autoclave can then be rotated into unlocked position by turning the valve 229 to the position indicated in broken lines in Fig. 8, after which the cover may be opened by turning the valve 203 to the position indicated by broken lines in Fig. 7. The laminated sandwiches may then be removed from the autoclave and the system is ready for the introduction of a fresh charge of work and the beginning of a new cycle.

From the foregoing, it will be evident that while the present invention is primarily concerned with a pressure system for use in the production of laminated safety glass, it is not limited to such use. As pointed out above, it is usually desired that the sandwiches be subjected to the action of both heat and pressure in order to obtain a satisfactory bonding of the various laminations, and to this end any suitable or well known type of closed heating and circulating means, which will produce a satisfactory and uniform temperature throughout the liquid in the autoclave, may be associated therewith without in any way interfering with the operation of the pressure system.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a pressure system, an autoclave adapted to be filled with liquid and within which work to be treated is received, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid within the autoclave and for subsequently cutting off such communication when it is desired to release the pressure in the autoclave, means for introducing additional elastic fluid into the auxiliary tank, and means operable by the elastic fluid for controlling the amount of such fluid introduced into the said tank whereby to maintain the pressure thereof within substantially predetermined limits.

2. In a pressure system, an autoclave adapted to be filled with liquid and within which work to be treated is received, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid within the autoclave and for subsequently cutting off such communication when it is desired to release the pressure in the autoclave, means for introducing liquid into the auxiliary tank, and means operable by a change in the level of the liquid in said tank for controlling the amount of liquid introduced thereinto whereby to maintain the said level within substantially predetermined limits.

3. In a pressure system, an autoclave adapted to be filled with liquid and within which work to be treated is received, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid within the autoclave and for subsequently cutting off such communication when it is desired to release the pressure in the autoclave, means for introducing additional elastic fluid into the auxiliary tank, means operable by the elastic fluid for controlling the amount of such fluid introduced into the said tank whereby to maintain the pressure thereof within substantially predetermined limits, means for introducing liquid into the auxiliary tank, and means operable by a change in the level of the liquid in said tank for controlling the amount of liquid introduced thereinto whereby to maintain the said level within substantially predetermined limits.

4. In a pressure system, an autoclave containing a supply of liquid and within which work to be treated is received, an auxiliary tank connected with the autoclave and containing additional liquid backed up by an elastic fluid under pressure, said autoclave being provided with a discharge outlet, means for establishing communication between the autoclave and auxiliary tank to cause the elastic fluid within the latter, acting upon the liquid therein, to force sufficient liquid therefrom into the autoclave to fill the same and to then exert pressure upon the liquid within said autoclave, said means being also operable for subsequently cutting off such communication between the auxiliary tank and autoclave and for opening the discharge outlet in the autoclave to cause a portion of the liquid to discharge therefrom, and means for introducing liquid into said auxiliary tank to compensate for the liquid forced therefrom into said autoclave.

5. In a pressure system, an autoclave containing a supply of liquid and within which work to be treated is received, an auxiliary tank connected with the autoclave and containing additional liquid backed up by an elastic fluid under pressure, said autoclave being provided with a discharge outlet, means for establishing communication between the autoclave and auxiliary tank to cause the elastic fluid within the latter, acting upon the liquid therein, to force sufficient liquid therefrom into the autoclave to fill the same and to then exert pressure upon the liquid within said autoclave, said means being also operable for subsequently cutting off such communication between the auxiliary tank and autoclave and for opening the discharge outlet in the autoclave to cause a portion of the liquid to discharge therefrom, means for introducing liquid into said auxiliary tank to compensate for the liquid forced therefrom into said autoclave, and means operable by a change in the level of the liquid in the auxiliary tank for controlling the amount of liquid introduced thereinto whereby to maintain the said level within substantially predetermined limits.

6. In a pressure system, an autoclave containing a supply of liquid and within which work to be treated is received, an auxiliary tank connected with the autoclave and containing additional liquid backed up by an elastic fluid under pressure, a discharge conduit leading from the autoclave and having its highest point at a level to which it is desired that the level of the liquid in the autoclave shall fall upon release of the pressure therein, means for establishing communication between the autoclave and auxiliary tank to cause the elastic fluid within the latter, acting upon the liquid therein, to force sufficient liquid therefrom into the autoclave to fill the same and to then exert pressure upon the liquid within the autoclave, said means being also operable for subsequently cutting off such communication between the auxiliary tank and autoclave and for establishing communication between the autoclave and the discharge conduit to cause the liquid within the autoclave to fall to a predetermined level, and means for introducing liquid into said auxiliary tank to compensate for the liquid forced therefrom into said autoclave.

7. In a pressure system, an autoclave containing a supply of liquid and within which work to be treated is received, an auxiliary tank connected with the autoclave and containing additional liquid backed up by an elastic fluid under pressure, a discharge conduit leading from the autoclave and having its highest point at a level to which it is desired that the level of the liquid in the autoclave shall fall upon release of the pressure therein, means for establishing communication between the autoclave and auxiliary tank to cause the elastic fluid within the latter, acting upon the liquid therein, to force sufficient liquid therefrom into the autoclave to fill the same and to then exert pressure upon the liquid within the autoclave, said means being also operable for subsequently cutting off such communication between the auxiliary tank and autoclave and for establishing communication between the autoclave and the discharge conduit to cause the liquid within the autoclave to fall to a predetermined level, means for introducing liquid into said auxiliary tank to compensate for the liquid forced therefrom into said autoclave, and means operable by a change in the level of the liquid in the auxiliary tank for controlling the amount of liquid introduced thereinto whereby to maintain the said level within substantially predetermined limits.

8. In a pressure system, an autoclave containing a supply of liquid and within which work to be treated is received, an auxiliary tank connected with the autoclave and containing additional liquid backed up by an elastic fluid under pressure, a surge tank connected with the autoclave and auxiliary tank, means for establishing communication between the autoclave and auxiliary tank to cause the elastic fluid within the latter, acting upon the liquid therein, to force sufficient liquid therefrom into the autoclave to fill the same and to then exert pressure upon the liquid therein, means for subsequently cutting off communication between the auxiliary tank and autoclave and for establishing communication between the said autoclave and surge tank to cause a portion of the liquid within the autoclave to discharge into the surge tank, and means for transferring liquid from the surge tank to the auxiliary tank to compensate for the liquid forced from said auxiliary tank into the autoclave.

9. In a pressure system, an autoclave containing a supply of liquid and within which work to be treated is received, an auxiliary tank connected with the autoclave and containing additional liquid backed up by an elastic fluid under pressure, a surge tank connected with the autoclave and auxiliary tank, means for establishing communication between the autoclave and auxiliary tank to cause the elastic fluid within the latter, acting upon the liquid therein, to force sufficient liquid therefrom into the autoclave to fill the same and to then exert pressure upon the liquid therein, means for subsequently cutting off communication between the auxiliary tank and autoclave and for establishing communication between the said autoclave and surge tank to cause a portion of the liquid within the autoclave to discharge into the surge tank, means for transferring liquid from the surge tank to the auxiliary tank to compensate for the liquid forced from said auxiliary tank into the autoclave, a supply line running to the auxiliary tank, and means operable automatically when the liquid in the surge tank falls below a predetermined level for cutting off communication between the surge tank and auxiliary tank and for establishing communication between the said auxiliary tank and supply line for introducing additional liquid into said auxiliary tank.

10. In a pressure system, an autoclave containing a supply of liquid and within which work to be treated is received, an auxiliary tank connected with the autoclave and containing additional liquid backed up by an elastic fluid under pressure, a surge tank connected with the autoclave by a conduit, the highest point of which is disposed at a level to which it is desired that the level of the liquid in the autoclave shall fall upon release of the pressure therein, means for establishing communication between the autoclave and auxiliary tank to cause the elastic fluid within the latter, acting upon the liquid therein, to force sufficient liquid therefrom into the autoclave to fill the same and to then exert pressure upon the liquid within the autoclave, means for subsequently cutting off communication between the auxiliary tank and autoclave and for establishing communication between the said autoclave and surge tank to cause the liquid within the autoclave to fall to a predetermined level, and means for transferring liquid from the surge tank to the auxiliary tank to compensate for the liquid forced from said auxiliary tank into the autoclave.

11. In a pressure system, an autoclave containing a supply of liquid and within which work to to be treated is received, an auxiliary tank connected with the autoclave and containing additional liquid backed up by an elastic fluid under pressure, a surge tank connected with the autoclave by a conduit, the highest point of which is disposed at a level to which it is desired that the level of the liquid in the autoclave shall fall upon release of the pressure therein, means for establishing communication between the autoclave and auxiliary tank to cause the elastic fluid within the latter, acting upon the liquid therein, to force sufficient liquid therefrom into the autoclave to fill the same and to then exert pressure upon the liquid within the autoclave, means for subsequently cutting off communication between the auxiliary tank and autoclave and for establishing communication between the said autoclave and surge tank to cause the liquid within the autoclave to fall to a predetermined level, means for transferring liquid from the surge tank to the auxiliary tank to compensate for the liquid forced from said auxiliary tank into the autoclave, a supply line running to the auxiliary tank, and means operable automatically when the liquid in the surge tank falls below a predetermined level for cutting off communication between the surge tank and auxiliary tank and causing additional liquid to be introduced into the said auxiliary tank through said supply line.

12. In a pressure system, an autoclave adapted to be filled with liquid and within which work to be treated is received, a closure means for said autoclave, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid in the autoclave and for subsequently cutting off such communication when it is desired to release the pressure in the autoclave, means for opening and closing said closure means, and hydraulic operating means associated with the pressure system and operable by liquid therefrom for actuating the said closure opening and closing means.

13. In a pressure system, an autoclave adapted to be filled with liquid and within which work to be treated is received, a closure means for said autoclave, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid in the autoclave and for subsequently cutting off such communication when it is desired to release the pressure in the autoclave, means for opening and closing said closure means, means for turning the closure means to effect the locking and unlocking thereof when in closed position, and hydraulic operating means associated with the pressure system and operable by liquid therefrom for actuating the closure turning means.

14. In a pressure system, an autoclave adapted to be filled with liquid and within which work to be treated is received, a closure means for said autoclave, an auxiliary tank connected with the autoclave and containing liquid backed up by an elastic fluid under pressure, means for establishing communication between the autoclave and auxiliary tank to cause the elastic fluid within said auxiliary tank, acting through the liquid therein, to exert pressure upon the liquid in the autoclave and for subsequently cutting off such communication when it is desired to release the pressure in the autoclave, means for opening and closing said closure means, hydraulic operating means associated with the pressure system and operable by liquid therefrom for actuating the said closure opening and closing means, means for turning the closure means to effect the locking and unlocking thereof when in closed position, and hydraulic operating means associated with the pressure system and operable by liquid therefrom for actuating the closure turning means.

JOHN L. DRAKE.
LE ROY L. HANDY.
IVAL G. FOWLER.